United States Patent [19]

Marchese

[11] Patent Number: 5,593,473
[45] Date of Patent: Jan. 14, 1997

[54] PROCESS FOR THE TREATMENT OF PORCINE EXCREMENT AND PRODUCT OBTAINED BY THIS PROCESS

[76] Inventor: Edoardo Marchese, 3 rue de Mouzin, 78230 Le Pecq, France

[21] Appl. No.: 401,901

[22] Filed: Mar. 10, 1995

[30] Foreign Application Priority Data

Mar. 10, 1994 [FR] France ................................. 94 02797

[51] Int. Cl.$^6$ ..................................................... C05F 3/00
[52] U.S. Cl. .................. 71/15; 71/21; 71/64.11; 71/64.13; 71/904
[58] Field of Search ..................... 71/12, 13, 15, 71/21, 22, 64.07, 64.11, 64.13, 904

[56] References Cited

U.S. PATENT DOCUMENTS 3,877,920  4/1975  Carlberg ........................................ 71/21

FOREIGN PATENT DOCUMENTS

| | | |
|---|---|---|
| 0201722 | 11/1986 | European Pat. Off. . |
| 3826873 | 3/1990 | Germany . |
| 1118563 | 7/1968 | United Kingdom . |
| 2129785 | 5/1984 | United Kingdom . |
| 2167398 | 5/1986 | United Kingdom . |
| WO93/23349 | 11/1993 | WIPO . |

OTHER PUBLICATIONS

I. Pentek et al., "Conversion of liquid manure and wastewaters into liquid fertilizer", *Chemical Abstracts*, vol. 100, No. 27, Apr. 23, 1984, Columbus, Ohio, p. 566.

A. H. Dirkzwager et al., "Sewage Sludge Treatment and Use: New ?Developments, Technological Aspects and Environmental Effects", *Elsevier Applied Science*, 1990, London, p. 502.

*Primary Examiner*—Ferris Lander
*Attorney, Agent, or Firm*—Young & Thompson

[57] ABSTRACT

A process for the treatment of porcine excrement, to transform it into fertilizer. To a liquid solution of porcine excrement, a solution of phosphorus pentoxide and potassium oxide is added in suitable proportions to obtain in the final product the desired ratio between nitrogen, phosphorus and potassium, and as a function of the nature of the soil and of the type of application, after which the obtained solution is mixed with a product adapted to retain water, having the desired shape of the final product, so as to obtain a shaped and conditioned fertilizer, which is subjected to a drying treatment. Preferably, the water-retentive product is in the form of granules of polyacrylamide, which swell in water to a number of times their size when dry. The granules absorb the liquid very quickly but release it only slowly, so that they can swell and dry over and over and so have a long effective life.

4 Claims, No Drawings

PROCESS FOR THE TREATMENT OF PORCINE EXCREMENT AND PRODUCT OBTAINED BY THIS PROCESS

The present invention has for its object the process for the treatment of porcine excrement, so as to transform it into fertilizer.

In the prior art, there is known a process for treating porcine excrement, so as to deodorize it. This process is more particularly known under the name "nitrification/denitrification treatment". Thus, thanks to the presence of microorganisms whose growth is promoted by the oxygen of the air, which is to say that an aerobic technique is used, the excrement is transformed into an odorless liquid which is constituted by a solution of elements and compounds comprising nitrogen, phosphorus, potassium and other components, while having an organic colloidal portion in suspension in this liquid medium. The ammoniacal nitrogen, which is the odor processing substance, decreases by about 95% with this treatment. The porcine excrement thus treated can be used for spreading on fields without trouble from the point of view of odor.

However this product has limited use as fertilizer, because, on the one hand, regulations in force limit the quantity and the frequency of spreading on fields, and, on the other hand, the fertilizer is not stabilized as to its chemical composition as between the three typical elements which constitute a fertilizer, namely nitrogen, phosphorus and potassium. Moreover, the liquid is difficult to transport, has a tendency to settle, which complicates a homogeneous spreading, and, moreover, its handling is complicated. As a result, porcine excrement, even when deodorized, is difficult to use far from the place where the pigs are raised.

An object of the present invention is therefore to overcome the drawbacks mentioned above, by providing a process, starting from technology which permits transforming deodorized porcine excrement into a complete fertilizer which is balanced as to all its components, namely principally nitrogen, phosphorus and potassium, this fertilizer being subjected to a drying treatment which renders it easy to handle and transport.

Another object of the invention is to provide a process for the production of a fertilizer which, because of its physical and chemical characteristics, satisfies the pollution standards in force worldwide, particularly in France and in the countries of the European Community.

The present invention therefore has for its object a process for the treatment of porcine excrement, to transform it into fertilizer, which process is characterized in that there is added to a liquid solution of porcine excrement, a solution of phosphorus pentoxide, and potassium oxide in suitable proportions to obtain in the final product the desired ratio between nitrogen, phosphorus and potassium, and this as a function of the nature of the soil to be treated and of the type of application, after which the obtained solution is mixed with a product adapted to retain an aqueous phase, this product having the form of the final desired product, so as to obtain a shaped and conditioned fertilizer, which is subjected to a drying treatment.

The process which is the object of the present invention is moreover notable by the following points:

the product adapted to retain water is a polymer selected, for example, from polyacrylamide derivatives, preferably simple copolymers or reticulated with other monomers, the polymer adapted to retain an aqueous phase is used in the form of granules, so as to obtain a fertilizer in the form of granules.

The invention also relates to a product in the form of dry granules, obtained according to the process described above and comprising 8 to 30% of total mineral material, 4 to 10% of organic material, 4 to 10% total nitrogen, 4 to 10% phosphorus ($P_2O_5$), 2 to 10% of potassium ($K_2O$), 0.3 to 0.5% ammoniacal nitrogen, the rest being a polymer adapted to retain water.

Other characteristics and advantages of the present invention will become apparent from a reading of the example of preparation of a fertilizer produced from porcine excrement using the process of the invention. This example is given solely by way of illustration and in no way limits the scope of the invention.

EXAMPLE

There is used as the first material, a porcine excrement deodorized according to the nitrification/denitrification technique, described above.

There is added to this excrement a solution of phosphorus pentoxide and potassium oxide, calculated on the basis of the ratio that it is desired to obtain in the final product between nitrogen, phosphorus and potassium.

There is obtained a solution which is mixed with a copolymer that retains water, for example a linear or reticulated polyacrylamide. This polymer which is present in dry form as transparent granules of 2 to 3 mm in diameter, has the property of swelling by absorbing aqueous phases through its semi-permeable walls. Thus the aqueous solution based on nitrogen, phosphorus pentoxide and potassium oxide, this solution constituting the principal component of the excrement, penetrates the interior of the granule and swells it.

During this penetration, the organic portion of the excrement in suspension deposits on the surface of the swollen granule.

As soon as the mass of the granules has absorbed all of the solution from the excrement, the granules are subjected to a drying technique, for example with pulsed hot air. Once this treatment is over, the dried granules return to their original shape and size. They enclose internally the complete chemical elements of a fertilizer and are clad in a thin layer constituted of organic elements which form the colloidal suspension which itself is also rich in fertilizing elements. It is to be noted that the principal and essential chemical elements and components remain confined in the granules. The granules obtained constitute an excellent fertilizer which possesses two essential characteristics: in the first place, slowly to free the active principals enclosed therein, and, secondly, not being subject, in the case of torrential rain, to transfer to the water courses and toward subterranean water.

In use, when the dried granules are distributed on the soil, for example in a proportion of 20 to 30 g/m$^2$ then mixed with the soil to a depth of 20 cm, they swell in the presence of water, for example from rain or an irrigation technique, which causes them to increase in volume several tens of times. The external layer of the granules, on which is deposited the colloidal portion of the solution of treated excrement, resumes its colloidal aspect and is immediately usable, as fertilizer, by the plants which find nutrition in its nutritive elements.

It will be noted that the semi-permeable wall of the granule, this semi-permeability being one of the characteristics of the water-retentive polymers, permits the very rapid entry of an aqueous phase, for example rain water, and a very slow exit of this aqueous phase, evidently modified by the incorporation of fertilizing elements. The roots of the plants can also penetrate within the granules where they find the fertilizing elements contained therein.

When the dried granule has lost the water that it encloses, another rain or irrigation causes it again to swell and there takes place thus in the soil the formation of small reservoirs of water enriched with fertilizing elements. The cycle repeats for a time which is a function of the water-retentive polymer chosen and of many other factors, which are difficult to control. The life of the product is estimated between three and five years with slow biodegradation.

This mechanism of the granules in which the water can penetrate very readily and leave very slowly, has the advantage that in the case of a strong rainfall, the fertilizing element does not leave and cannot pollute the rivers and subterranean ground water. It can thus be estimated that with this system, the porcine excrement is transformed into a complete fertilizer, clean, odor free, easy to store and having an essential ecological advantage with respect to other fertilizers which are, for the most part, carried off in streams of water in the case of very strong rainfall or abundant irrigation.

There will be given hereafter a non-limiting example of a formulation:

to produce a fertilizer according to the invention, four parts by weight of deodorized porcine excrement are used. This excrement has the following composition:
dry materials: 4.8%;
total mineral materials: 2.0%;
organic materials: 2.8%;
total nitrogen (principally in the form of urea): 0.16%;
phosphorus (principally in the form of phosphorus pentoxide): 0.36%;
potassium (principally in the form of potassium oxide): 0.46%;
ammoniacal nitrogen: 0.013%.

This excrement is mixed with one part of a chelated solution of $P_2O_5$ and $K_2O$ distributed by Societe NPK+.

As soon as the mass is well homogenized, there are added two parts by weight of an acrylic polymer sold under the trade name Aquastore by American Cyanamid.

The mass is permitted to swell for several minutes after which it is subjected to a drying treatment until a completely dry granule is obtained. The product is stored preventing any contact with the air, because it is strongly hygroscopic.

It is clear that the invention is in no way limited to the example described above, but it includes all modifications and variations from the same basic principle. It is thus unimportant what other polymers susceptible to retain water or an aqueous phase can be used for this invention.

I claim:

1. Process for producing fertilizer from porcine excrement, comprising the steps of adding phosphorous pentoxide and potassium oxide to a liquid solution of porcine excrement, mixing the resulting solution with granules of a water-swellable polyacrylamide such that aqueous components of said resulting solution are absorbed by said granules whereas organic components of said resulting solution coat said granules, and drying the material thus obtained.

2. Process according to claim 1, wherein said polyacrylamide is a polymer selected from the group consisting of simple and reticulated derivatives of polyacrylamides.

3. Process according to claim 1, wherein said granules swell with water to several times their size when dry.

4. A fertilizer produced by combining a solution containing liquid porcine excrement, phosphorous pentoxide and potassium oxide, with granular polyacrylamide derivatives, comprising granules of a water-swellable polyacrylamide derivative, said granules interiorly containing aqueous components of said porcine excrement, potassium and phosphorus; said granules further comprising a surface coating of organic components of said porcine excrement.

\* \* \* \* \*

UNITED STATES PATENT AND TRADEMARK OFFICE
CERTIFICATE OF CORRECTION

PATENT NO. : 5,593,473
DATED : January 14, 1997
INVENTOR(S) : Edoardo MARCHESE

It is certified that error appears in the above-indentified patent and that said Letters Patent is hereby corrected as shown below:

On the title page, after Item [75], insert the following:

--[73] Assignee: SC Kheper Biotechnologies, Vigneux Sur Seine, France--

Signed and Sealed this

First Day of April, 1997

Attest:

BRUCE LEHMAN

Attesting Officer

Commissioner of Patents and Trademarks